United States Patent
Park et al.

(10) Patent No.: US 10,112,172 B2
(45) Date of Patent: Oct. 30, 2018

(54) EGG-SHELL TYPE HYBRID STRUCTURE OF HIGHLY DISPERSED NANOPARTICLE-METAL OXIDE SUPPORT, PREPARATION METHOD THEREOF, AND USE THEREOF

(71) Applicant: Korea Institute of Energy Research, Daejeon (KR)

(72) Inventors: Ji Chan Park, Daejeon (KR); Jung Il Yang, Daejeon (KR); Heon Jung, Daejeon (KR); Ho Tae Lee, Daejeon (KR); Dong Hyun Chun, Daejeon (KR); Sung Jun Hong, Daejeon (KR); Jae In Kwon, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 15/115,302

(22) PCT Filed: Jul. 31, 2015

(86) PCT No.: PCT/KR2015/008070
§ 371 (c)(1),
(2) Date: Jul. 29, 2016

(87) PCT Pub. No.: WO2016/060367
PCT Pub. Date: Apr. 21, 2016

(65) Prior Publication Data
US 2017/0001168 A1     Jan. 5, 2017

(30) Foreign Application Priority Data

Oct. 17, 2014 (KR) .................. 10-2014-0140756
Feb. 25, 2015 (KR) .................. 10-2015-0026811

(51) Int. Cl.
*B01J 20/06* (2006.01)
*B01J 20/28* (2006.01)
(Continued)

(52) U.S. Cl.
CPC ............. *B01J 20/06* (2013.01); *B01J 20/103* (2013.01); *B01J 20/28* (2013.01);
(Continued)

(58) Field of Classification Search
CPC . B01J 20/06; B01J 20/28; B01J 20/103; B01J 20/28016; B01J 20/3021;
(Continued)

(56) References Cited

U.S. PATENT DOCUMENTS 7,829,140 B1 *  11/2010  Zhong ................ A61K 49/183
                                                             427/212
8,361,924 B2 *  1/2013  Tanaka .................... B01J 21/18
                                                             429/400
(Continued)

FOREIGN PATENT DOCUMENTS

KR   10-2012-0021570 A   3/2012
KR   10-2012-0137111 A   12/2012
(Continued)

OTHER PUBLICATIONS

International Search Report issued in PCT/KR2015/008070 dated Nov. 10, 2015 (2 pages).
(Continued)

*Primary Examiner* — Cam N. Nguyen
(74) *Attorney, Agent, or Firm* — Osha Liang LLP

(57) ABSTRACT

The present invention relates to an egg-shell type hybrid structure of highly dispersed nanoparticles-metal oxide support, a preparation method thereof, and a use thereof. Specifically, the present invention relates to an egg-shell type hybrid structure of highly dispersed nanoparticles-
(Continued)

metal oxide support, providing an excellent platform in a size of nanometers or micrometers which can support nanoparticles selectively in the porous shell portion by employing a metal oxide support with an average diameter of nanometers or micrometers including a core of nonporous metal oxide and a shell of porous metal oxides, a preparation method thereof, and a use thereof.

19 Claims, 4 Drawing Sheets

(51) Int. Cl.
| | |
|---|---|
| *B01J 20/10* | (2006.01) |
| *B01J 20/30* | (2006.01) |
| *B01J 20/32* | (2006.01) |
| *B01J 21/06* | (2006.01) |
| *B01J 21/08* | (2006.01) |
| *B01J 23/745* | (2006.01) |
| *B01J 23/75* | (2006.01) |
| *B01J 23/755* | (2006.01) |
| *B01J 35/00* | (2006.01) |
| *B01J 35/02* | (2006.01) |
| *B01J 37/00* | (2006.01) |
| *B01J 37/02* | (2006.01) |
| *B01J 37/08* | (2006.01) |
| *H01M 4/90* | (2006.01) |

(52) U.S. Cl.
CPC ..... *B01J 20/28016* (2013.01); *B01J 20/3021* (2013.01); *B01J 20/3078* (2013.01); *B01J 20/3204* (2013.01); *B01J 20/3234* (2013.01); *B01J 20/3293* (2013.01); *B01J 21/06* (2013.01); *B01J 21/08* (2013.01); *B01J 23/745* (2013.01); *B01J 23/75* (2013.01); *B01J 23/755* (2013.01); *B01J 35/00* (2013.01); *B01J 35/0006* (2013.01); *B01J 35/0013* (2013.01); *B01J 35/02* (2013.01); *B01J 35/026* (2013.01); *B01J 37/0018* (2013.01); *B01J 37/0072* (2013.01); *B01J 37/0221* (2013.01); *B01J 37/082* (2013.01); *H01M 4/90* (2013.01)

(58) Field of Classification Search
CPC ................ B01J 20/3078; B01J 20/3204; B01J 20/3234; B01J 20/3293; B01J 23/745; B01J 23/75; B01J 23/755; B01J 35/00; B01J 35/0006; B01J 35/0013; B01J 35/02; B01J 35/026; B01J 37/0018; B01J 37/0072; B01J 37/0221; B01J 37/083; B01J 21/06; B01J 21/08
See application file for complete search history.

(56) References Cited

U.S. PATENT DOCUMENTS

| | | | | |
|---|---|---|---|---|
| 8,658,039 | B2* | 2/2014 | Linford | B01J 20/28004 210/198.2 |
| 8,669,202 | B2* | 3/2014 | van den Hoek | B82Y 30/00 502/262 |
| 8,685,283 | B2* | 4/2014 | Wei | B01J 20/08 252/408.1 |
| 9,005,436 | B2* | 4/2015 | Linford | B01J 13/02 210/198.2 |
| 9,192,915 | B2* | 11/2015 | Linford | B01J 13/02 |
| 9,283,545 | B2* | 3/2016 | Asefa | B01J 21/08 |
| 9,284,456 | B2* | 3/2016 | Lofton | B01J 20/08 |
| 9,511,575 | B2* | 12/2016 | Linford | B01J 20/28004 |
| 9,592,492 | B2* | 3/2017 | Biberger | B01J 37/08 |
| 9,663,404 | B2* | 5/2017 | de Diego | C04B 35/117 |
| 2010/0258759 | A1* | 10/2010 | Archer | B82Y 30/00 252/62.56 |
| 2014/0057179 | A1* | 2/2014 | Yushin | H01M 4/364 429/238 |
| 2014/0170503 | A1* | 6/2014 | Yushin | H01M 10/0525 429/306 |
| 2017/0173561 | A1* | 6/2017 | Lawrence | B01J 20/289 |

FOREIGN PATENT DOCUMENTS

| | | |
|---|---|---|
| KR | 10-2013-0013568 A | 2/2013 |
| KR | 10-1373823 B1 | 3/2014 |

OTHER PUBLICATIONS

Written Opinion of the International Searching Authority issued in PCT/KR2015/008070 dated Nov. 10, 2015 (7 pages).
Khodakov, A. et al.; "Advances in the Development of Novel Cobalt Fischer-Tropsch Catalysts for Synthesis of Long-Chain Hydrocarbons and Clean Fuels"; American Chemical Society, Chemical Reviews, vol. 107, No. 5, 2007, pp. 1692-1744 (53 pages).
Park, J. et al.; "Ni@SiO2 yolk-shell nanoreactor catalysts: High temperature stability and recydability"; Journal of Materials Chemistry, vol. 20, No. 7, Feb. 21, 2010, pp. 1239-1246 (9 pages).
Gardezi, S.A. et al.; "Synthesis of Tailored Eggshell Cobalt Catalysts for Fischer-Tropsch Synthesis Using Wet Chemistry Techniques"; I&EC research Industrial & Engineering Chemistry Research, 51, 2012, pp. 1703-1712 (10 pages).
Iglesia, E. et al.; "Synthesis and Catalytic Properties of Eggshell Cobaly Catalysts for the Fischer-Tropsch Synthesis"; Journal of Catalysts, 153, 1995, pp. 108-122 (15 pages).
Saib, A.M. et al.; "Preparation and characterisation of spherical Co/SiO2 model catalysts with well-defined nano-sized cobalt crystallites and a comparison of their stability against oxidation with water"; Journal of Catalysis, 239, 2006, pp. 326-339 (14 pages).
Batail, N. et al.; "Controlled Synthesis and High Oxidation Stability of Cobalt Nanopartides Encapsulated in Mesoporous Silica using a Modified Sieber Approach and a Pseudomorphic Transformation"; European Journal of Inorganic Chemistry, 2013, pp. 1258-1264 (7 pages).
Xie, R. et al.; "Controlled Preparation of Co3O4@porous-S1O2 Nanocomposites for Fischer-Tropsch Synthesis"; Catal Lett, vol. 144, 2014, pp. 516-5238 (8 pages).
Kwon, J. et al.; "A Facile Synthesis of SiO2@Co/mSiO2 Egg-Shell Nanoreactors for Fischer-Tropsch Reaction"; International Conference on Nano Science and Nano Technology, Nov. 6-7, 2014. (3 pages).

* cited by examiner

[FIG. 1]
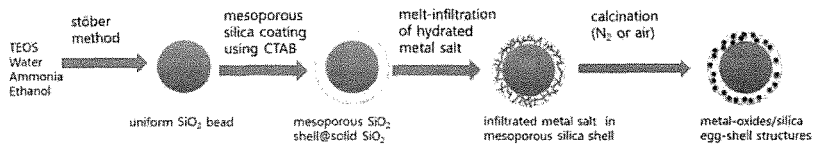
[FIG. 2]
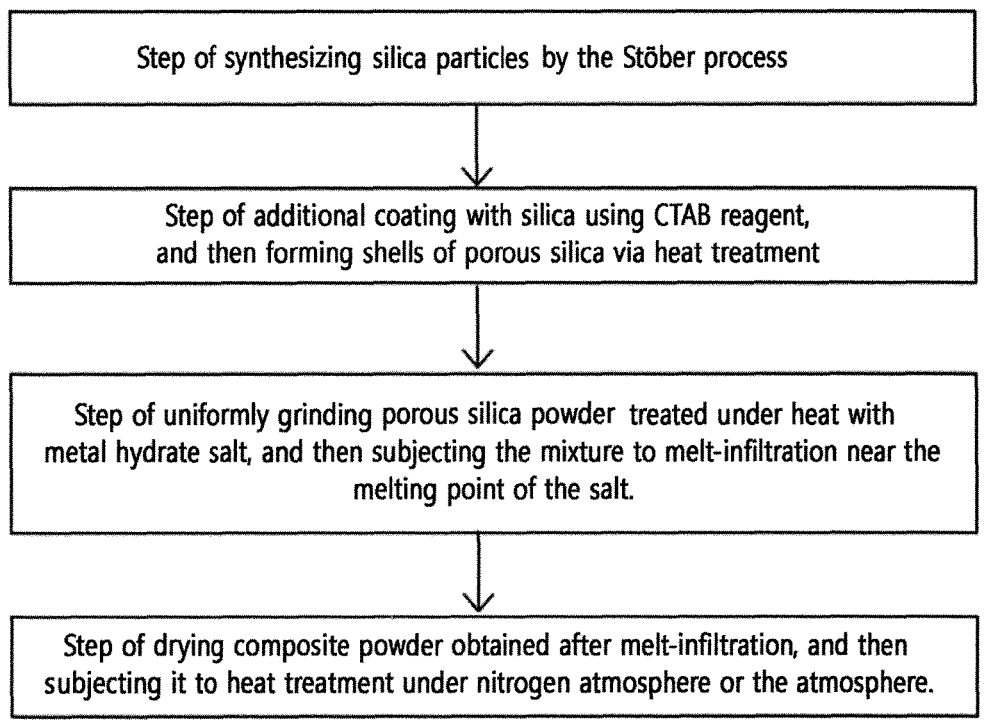

[FIG. 3]
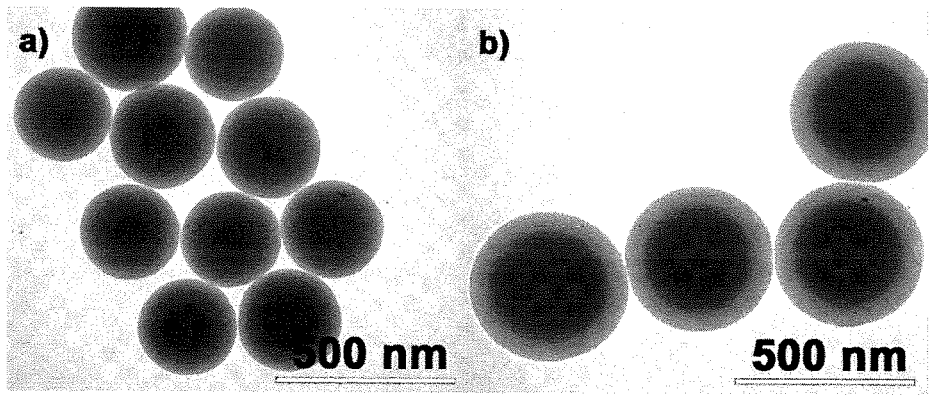
[FIG. 4]
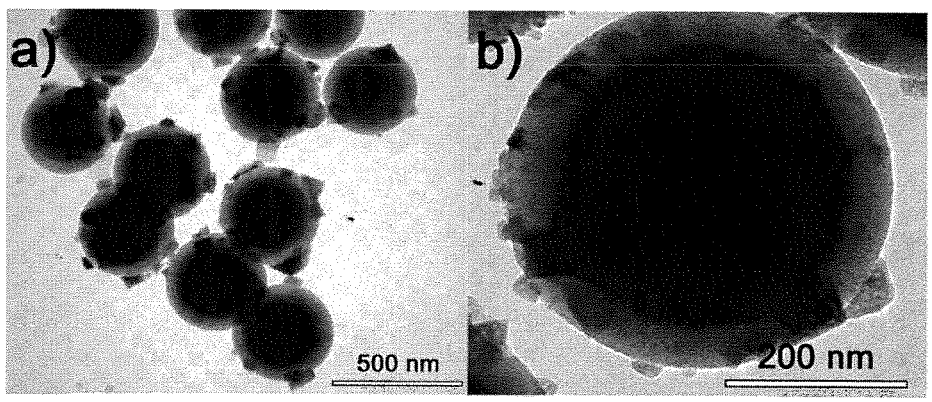
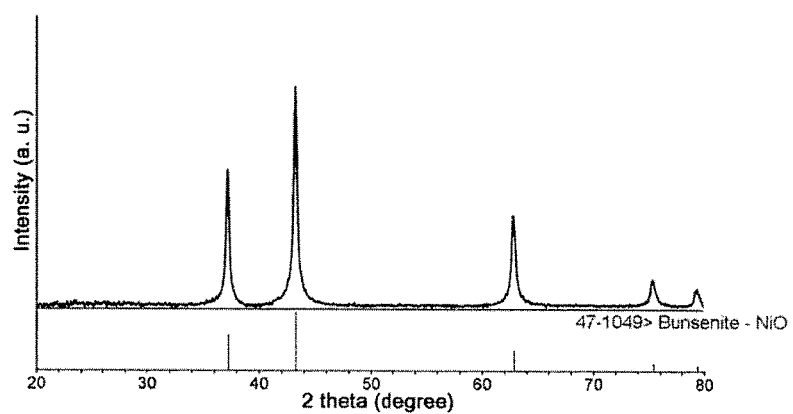

[FIG. 5]
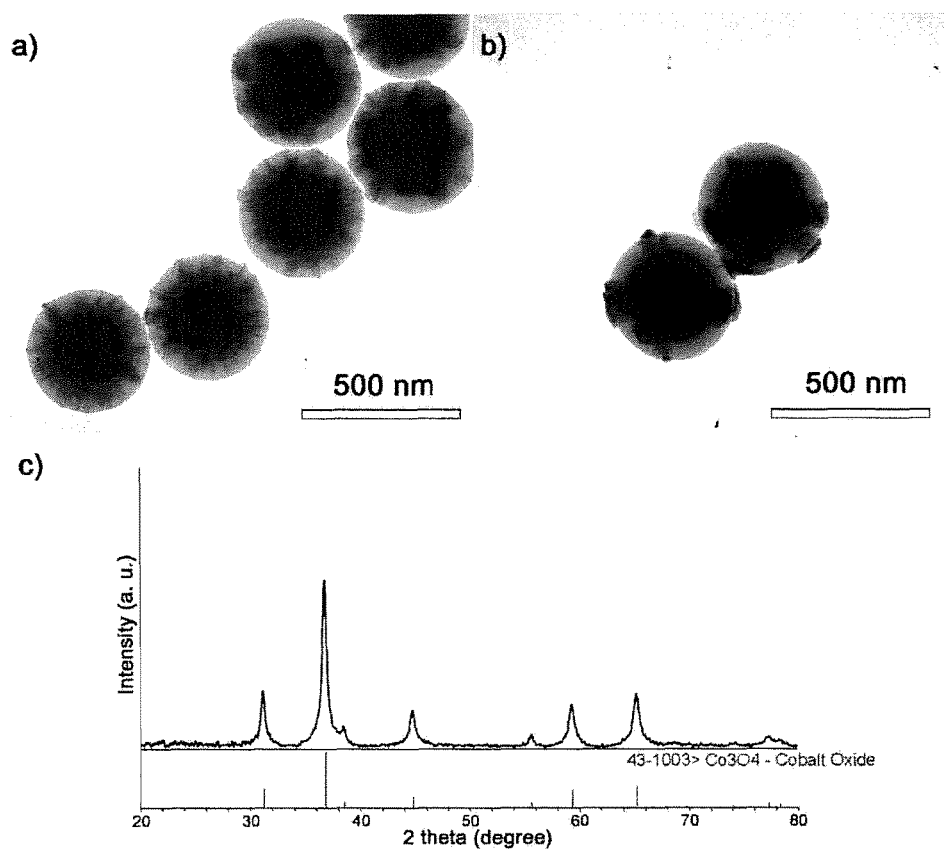
[FIG. 6]
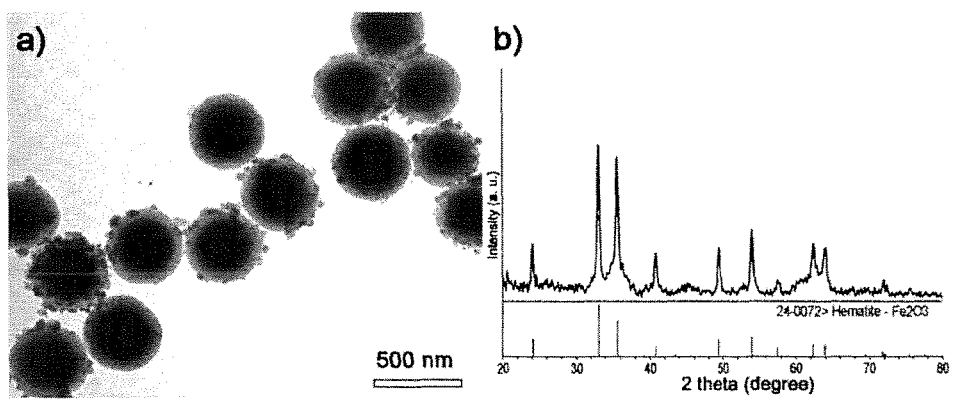

[FIG. 7]
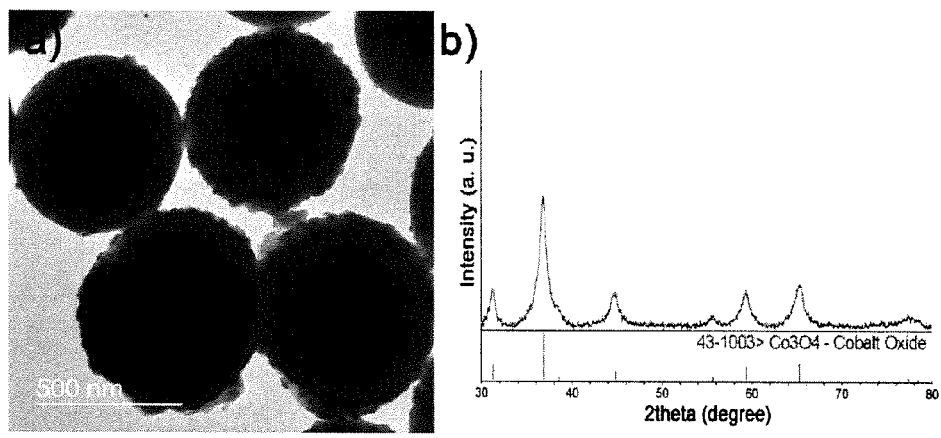
[FIG. 8]
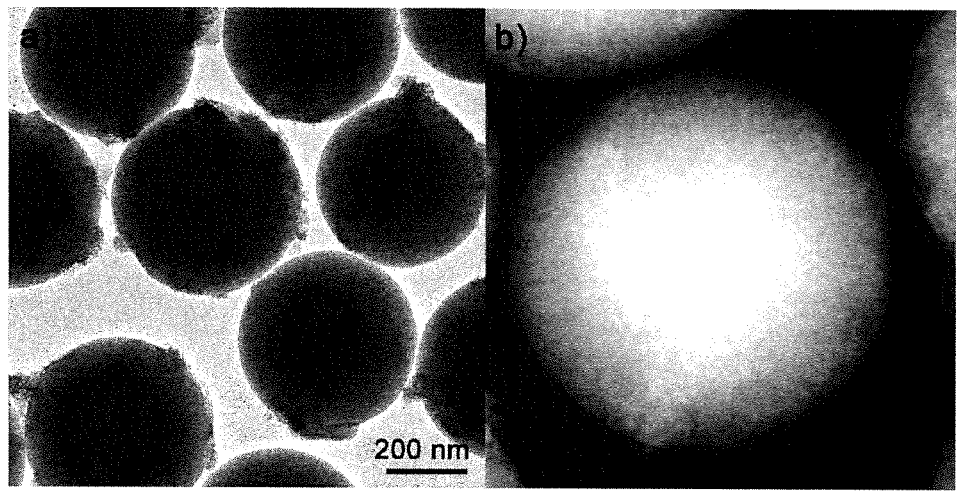

EGG-SHELL TYPE HYBRID STRUCTURE OF HIGHLY DISPERSED NANOPARTICLE-METAL OXIDE SUPPORT, PREPARATION METHOD THEREOF, AND USE THEREOF

TECHNICAL FIELD

The present invention relates to an egg-shell type hybrid structure of highly dispersed nanoparticle-metal oxide support, a preparation method thereof, and a use thereof.

BACKGROUND ART

In the case of metal-silica catalysts prepared by co-precipitation or wetness impregnation, a previously known technique for catalyst preparation, some disadvantages may arise in that when metal content increases, the size of particles increases and becomes uneven due to particle aggregation, and that sintering may easily occur during a high-temperature calcination at 600° C. or higher.

To overcome such disadvantages, hybrid structures between metal active materials and porous silica, which is recently used as a support in supported catalysts, have been developed, and attempts have been made for various approaches in developing core-shell or yolk-shell structures, etc (Park et al., J. Mater. Chem., 2010, 20, 1239-1246). However, the structures previously suggested have disadvantages in that the preparation processes thereof are rather complicated, and that mass production is difficult to achieve and time-consuming.

Specifically, in the case of egg-shell structures consisting of cobalt and silica as ingredients, which are known to show high activity in the Fischer-Tropsch reaction, they show advantages in the control of heat of reaction or reactant diffusion among various reactions compared to general pellet-type catalysts, and thus are widely applied (Gardezi, S. A. et. al. Ind. Eng. Chem. Res. 2012, 51, 17031712).

However, the overall particle size is very large with a size of 1 mm to 2 mm, and the shell, which comprises the supported catalyst particles, is also very large with a thickness of 0.2 mm to 0.5 mm, and thus they are unfavorable in view of dispersibility of the supported cobalt particles and in view of rapid diffusion and contact efficiency of reactants on the surfaces of the cobalt particles.

DISCLOSURE

Technical Problem

An objective of the present invention is to provide a hybrid structure in the form of an egg-shell having a size of nanometers or micrometers, which can selectively support nanoparticles only in a porous shell portion, a preparation method thereof, and a use thereof.

Technical Solution

A first aspect of the present invention is to provide a hybrid structure in the form of an egg-shell comprising: a metal oxide support with an average diameter of nanometers or micrometers including a core of nonporous metal oxide and a shell of porous metal oxides; and nanoparticles having a limited position and size by pores of the shell of the metal oxide support; wherein the nanoparticles are highly dispersed into the pores of the surface of the metal oxide support.

A second aspect of the present invention is to provide a method for preparing the hybrid structure according to the first aspect comprising: preparing particles of nonporous metal oxides (Step 1); coating pore-forming materials and precursors of metal oxides onto the surface of particles of the nonporous metal oxides, followed by thermal treatment to form a shell of porous metal oxides, thereby obtaining powder of a metal oxide support having a core-shell structure (Step 2); grinding the powder of the metal oxide support of the core-shell structure and a metal-containing compound having a melting point lower than that of the metal oxide support and mixing the same, and subsequently subjecting the metal-containing compound to melt infiltration into the pores of the surface of the metal oxide support at a temperature between the melting point of the metal-containing compound and 5° C. higher in a closed system (Step 3); and calcining composite powder formed from melt infiltration (Step 4).

A third aspect of the present invention is to provide a catalyst in the form of an egg-shell, comprising a metal oxide support with an average diameter of nanometers or micrometers including a core of nonporous metal oxide and a shell of porous metal oxides; and particles of a nano catalyst having a limited position and size in pores of the shell of the metal oxide support; wherein the particles of the nano catalyst are highly dispersed into the pores of the surface of the metal oxide support.

A fourth aspect of the present invention is to provide an electrode material in the form of an egg-shell, comprising a metal oxide support with an average diameter of nanometers or micrometers including a core of nonporous metal oxide and a shell of porous metal oxides; and particles of a nano electrode active material having a limited position and size in pores of the shell of the metal oxide support; wherein the particles of the nano electrode active material are highly dispersed into the pores of the surface of the metal oxide support.

A fifth aspect of the present invention is to provide a sensor materials in the form of an egg-shell, comprising a metal oxide support with an average diameter of nanometers or micrometers including a core of nonporous metal oxide and a shell of porous metal oxides; and particles of a nano sensor having a limited position and size in pores of the shell of the metal oxide support; wherein the particles of the nano sensor are highly dispersed into the pores of the surface of the metal oxide support.

A sixth aspect of the present invention is to provide an adsorbent material in the form of an egg-shell, comprising a metal oxide support with an average diameter of nanometers or micrometers including a core of nonporous metal oxide and a shell of porous metal oxides; and particles of a nano adsorbent having a limited position and size in pores of the shell of the metal oxide support; wherein the particles of the nano adsorbent are highly dispersed into the pores of the surface of the metal oxide support.

Hereinafter, the present invention will be described in detail.

The conventional egg-shell catalysts in a size of millimeters are prepared generally by regulating infiltration time of a metal salt or by controlling a selective adsorption technique using viscosity or affinity. However, the selective adsorption of the metal salt may not easily occur on supports in a size of micrometers or nanometers, and as a result, it is hardly possible to prepare an egg-shell catalyst in a silica support with a size of nanometers. Also, because the thickness of shell portion of the millimeter-sized egg-shell catalyst is also very large with a size of millimeters, the dispersibility of catalyst active materials of metal or metal oxides, etc., which are supported on the shell, may decrease, and the catalyst may be unfavorable in terms of rapid diffusion and contact efficiency of reactants in the surfaces of particles of the catalyst active materials.

For the first time, the present invention provides an egg-shell type hybrid structure which is uniformly regulated in a size of nanometers or micrometers, by preparing a metal oxide support with an average diameter of nanometers or micrometers including a core of nonporous metal oxide and a shell of porous metal oxides; and nanoparticles having a limited position and size by pores of the shell of the metal oxide support and thus being highly dispersed into the pores of the surface of the metal oxide support, thereby completing the present invention.

In the present invention, the metal oxide support has a core-shell structure including a core of dense nonporous metal oxide and a shell of porous metal oxides formed onto the core, and thus nanoparticles having activities are not located at the dense core portion, but rather at the shell portion, preferably only at pores of the shell portion selectively, and such site selectivity may limit the size of the nanoparticles to the size of the pores of the shell portion, thereby uniformly regulating the size of the overall hybrid structure to a size of nanometers or micrometers of the metal oxide support.

That is, the present invention provides a nanoparticle/metal oxide support hybrid structure in which active materials with a size of nanometers, preferably a size of 20 nm or less are selectively and highly dispersed into the pores of the shell of the metal oxide support including a nonporous core and a porous shell, thereby being thermally stable. As such, the core is composed of densely packed metal oxides and the shell has a porous structure in which many pores are formed, and thus, active nanoparticles are selectively located at the shell of metal oxides whose pores are large. As a result, the egg-shell type of hybrid structure including the nanoparticle composed of various types of metal or metal oxides having a size of nanometers and the metal oxide support may be easily and uniformly obtained.

In the present invention, the metal oxide support may form the shell of porous metal oxides by coating pore-forming materials and precursors of metal oxides onto the surface of particles of nonporous metal oxides, followed by removal of the pore-forming materials via thermal treatment.

The pore-forming materials may be neutral, anion, or cation surfactants as a type of a structure-directing agent. For example, alkylamine-based or alkylammonium halide-based surfactants may be used. For example, alkyl in the alkylamine-based or alkylammonium halide-based surfactants may be an alkyl having 2 to 24 carbons in a straight chain or a side chain. Specifically, as the alkylammonium halide-based surfactant, trialkylammonium alkyl halide, for example, tri($C_{1\ to\ 6}$ alkyl)ammonium $C_{10\ to\ 30}$ alkylbromide may be used, and for example, cetyltrimethylammonium bromide (CTAB) having a long carbon chain of 16 carbons may be used, but it is not limited thereto. As the pore-forming materials have a long carbon chain, they remain with the precursors of metal oxides during mixing thereof, and then are removed upon thermal treatment, thereby playing a role in forming pores.

In the present invention, the metal oxides of the metal oxide support may be silica, alumina, titania, zirconia, or a mixture thereof. In the present invention, the metal oxides in the core portion and shell portion of the metal oxide support may be the same kind or different kinds.

In an embodiment of the present invention, a silica support, in which the metal oxides of the core portion and shell portion are all silica, was used as the metal oxide support.

In the present invention, the silica support may form a porous silica shell by synthesizing particles of nonporous silica preferably via the Stober process, then coating pore-forming materials and precursors of silica onto the surface of particles of the nonporous silica, followed by removal of the pore-forming materials via thermal treatment. The precursors of silica may be TEOS (tetraethyl orthosilicate), TMOS (tetramethyl orthosilicate) or a mixture thereof, but are not limited thereto.

In the present invention, the nanoparticles located in the shell may be metal or metal oxides, specifically they may be nickel oxides, cobalt oxides, iron oxides, nickel, cobalt, iron, or a mixture thereof, but are not limited thereto.

In the present invention, the nanoparticles of metal or metal oxides may be located into the pores of the shell of the metal oxide support by grinding powder of the metal oxide support and a metal-containing compound having a melting point lower than that of the metal oxide support and mixing the same, and subsequently subjecting the metal-containing compound to melt infiltration into the pores of the surface of the metal oxide support at a temperature between the melting point of the metal-containing compound and 5° C. higher in a closed system, followed by calcining composite powder formed therefrom.

That is, in the present invention, the hybrid structure may be employed in melt infiltration, the processes of which are simple and which is ultimately beneficial to high dispersion of particles, as an impregnation of nanoparticles. The impregnation of nanoparticles employed in the present invention is beneficial to high dispersion of nanoparticles as it takes an approach of grinding powder of a metal oxide support and a metal-containing compound having a melting point lower than that of the metal oxide support and mixing the same without solvents (solvent free), thereby preventing dilution, etc. that may occur due to solvents, and thus, the egg-shell type hybrid structure having a size of nanometers may be easily prepared.

The high dispersion of nanoparticles in the present invention may refer to dense dispersion of nanoparticles, that is, a large volume of nanoparticles dispersed per unit volume. According to the present invention, the nanoparticles may be highly dispersed with a volume of 50% of more, preferably 70% or more, more preferably 80% or more, and most preferably 90% or more, based on the total volume of pores in the shell.

Specifically, the metal-containing compound having a melting point lower than that of the metal oxide support may be a metal hydrate salt, but is not limited thereto. The examples of metal hydrate salts available to be used in the present invention and the melting points thereof are shown in Table 1.

TABLE 1

| Metal hydrate salt | Melting point (° C.) |
|---|---|
| $MgCl_2 \cdot 6H_2O$ | 118 |
| $Mg(NO_3)_2 \cdot 6H_2O$ | 88.9 |
| $Al(NO_3)_3 \cdot 9H_2O$ | 72.8 |
| $Cr(NO_3) \cdot 9H_2O$ | 60.06 |
| $Ca(NO_3)_3 \cdot 4H_2O$ | 42.7 |
| $ZnSO_4 \cdot 6H_2O$ | 70 |
| $Fe(NO_3)_3 \cdot 9H_2O$ | 47.2 |
| $Co(NO_3)_2 \cdot 6H_2O$ | 55 |

TABLE 1-continued

| Metal hydrate salt | Melting point (° C.) |
|---|---|
| Ni(NO$_3$)$_2$•6H$_2$O | 56.7 |
| Cu(NO$_3$)$_2$•3H$_2$O | 114 |
| Zn(NO$_3$)$_3$•H$_2$O | 45.5 |
| Zn(NO$_3$)•6H$_2$O | 36.4 |
| Sr(NO$_3$)$_2$•4H$_2$O | 100 |
| CrCl$_3$•6H$_2$O | 83 |
| CaCl$_2$•6H$_2$O | 45 |
| MnCl$_2$•4H$_2$O | 58 |
| FeCl$_3$•6H$_2$O | 37 |
| CoCl$_2$•6H$_2$O | 86 |
| CuCl$_2$•2H$_2$O | 100 |
| SrCl$_2$•6H$_2$O | 115 |
| Al$_2$(SO$_4$)$_3$•18H$_2$O | 86 |
| Cr$_2$(SO$_4$)$_3$•12H$_2$O | 90 |
| FeSO$_4$•7H$_2$O | 70 |
| CoSO$_4$•7H$_2$O | 74 |
| NiSO$_4$•6H$_2$O | 53 |
| CuSO$_4$•5H$_2$O | 110 |

According to the present invention, regulating the calcination atmosphere of the composite powder, for example, regulating temperature and/or gas atmosphere could control the dispersibility and oxidation state of the particles of metal or metal oxides or both thereof. Specifically, it was confirmed that the size of crystals of particles of cobalt oxides in the hybrid structure obtained through calcination process at 400° C. under nitrogen atmosphere can become smaller compared to those obtained through calcination under the atmosphere (Example 3, FIG. 5c).

In the present invention, the calcination may preferably be carried out in a temperature range of 200° C. to 700° C. under the atmosphere or nitrogen atmosphere.

In the present invention, the composite powder may be subjected to drying prior to calcination. Herein, the drying may be carried out at 50° C. to 70° C. for 12 to 48 hours.

In the present invention, an average diameter of the nanoparticles may preferably be 2 nm to 20 nm considering the dispersibility and optimal activities thereof.

In the present invention, an average diameter of the hybrid structure may be 100 nm to 1000 nm.

A method for preparing the hybrid structure according to the present invention may include preparing particles of nonporous metal oxide (Step 1); coating pore-forming materials and precursors of metal oxides onto the surface of particles of the nonporous metal oxides, followed by thermal treatment to form a shell of porous metal oxides, thereby obtaining powder of a metal oxide support having a core-shell structure (Step 2); grinding the powder of the metal oxide support of the core-shell structure and a metal-containing compound having a melting point lower than that of the metal oxide support and mixing the same, and subsequently subjecting the metal-containing compound to melt infiltration into the pores of the surface of the metal oxide support at a temperature between the melting point of the metal-containing compound and 5° C. higher in a closed system (Step 3); and calcining composite powder formed from melt infiltration (Step 4).

In the method for preparing the hybrid structure according to the present invention, the types and roles of the metal oxides, pore-forming materials, precursors of metal oxides, metal oxide support, and the metal-containing compound having a melting point lower than that of the metal oxide support are identical to those described in the hybrid structure. Also, the process conditions for each step above are identical to those described in the hybrid structure.

FIG. 1 is a schematic diagram showing the egg-shell type hybrid structure of highly dispersed metal or metal oxide/silica, in the case where the silica support is used as the metal oxide support according to one embodiment of the present invention. FIG. 2 is a flow chart showing the preparation process of the egg-shell type hybrid structure of highly dispersed metal or metal oxide/silica according to one embodiment of the present invention.

In one preferred embodiment, Step 1 may be carried out by the Stober process, and it may be a step for synthesizing particles of silica with a size of 100 nm to 1000 nm in a sphere shape using tetraethyl orthosilicate (TEOS) or tetramethyl orthosilicate (TMOS), which are precursors of silica, under an alcohol- and water-based condition. The alcohols that can be used in the Stober process may be methanol, ethanol, 2-propanol, etc., and the use of ethanol may be preferable in order to obtain silica in a uniform shape. TEOS and TMOS are similar in terms of uniformity and size, but TMOS is five times as expensive as TEOS, and thus is unfavorable in economical aspects.

In one preferred embodiment, Step 2 may be a step for forming a shell, which is the skin, by coating precursors of silica and CTAB, which are a pore-forming material, onto particles of silica, which are the particles of nonporous metal oxides, and then subjecting to heat treatment to remove CTAB.

In one preferred embodiment, the metal hydrate salt in Step 3, which is melt infiltrated into the silica support, may be at least one among those having a melting point of 30° C. to 120° C. in Table 1, and specifically, it may be at least one selected from Ni(NO$_3$)$_2$.6H$_2$O (melting point=56.7° C.), Co(NO$_3$)$_2$.6H$_2$O (melting point=55° C.), and Fe(NO$_3$)$_3$.9H$_2$O (melting point=47.2° C.).

In the preparation method according to the present invention, when applying Step 3 of grinding and mixing the powder of the metal oxide support and the metal-containing compound having a melting point lower than that of the metal oxide support, preferably a metal hydrate salt, and then selectively subjecting to melt-infiltration into pores of the shell of the metal oxide support, and if the melting point of the metal-containing compound having a melting point lower than that of the metal oxide support reaches below 30° C., the salt cannot be uniformly mixed with the support, because the salt melts partially or entirely at room temperature, whereas, if the melting point exceeds 120° C., it can be problematic as the steam pressure inside of a reaction container significantly increases.

In order to effectively impregnate the metal-containing compound, preferably the metal hydrate salt, by melting the same, the regulation of temperature and maintenance of pressure inside of a reaction container are essential. Preferably, infiltration is carried out at a temperature 2° C. to 5° C. higher than the melting point of the metal hydrate salt to be infiltrated, and such reaction is preferably carried out in a closed system in order to prevent escape of pressure, that is, steam pressure generated during reaction. The reaction time may be 4 to 48 hours, preferably 24 to 28 hours, to give sufficient time for salts to be melted and infiltrated into the pores.

In one preferred embodiment, Step 4 above may be a step of calcinating the hydrated metal salt, which is selectively supported in the porous shell of the support, under nitrogen atmosphere or the atmosphere, thereby forming particles of metal oxides in a size of nanometers. The hydrated metal salt selectively supported on the porous shell of the support is subjected to decomposition by calcination, thereby forming particles in a size of nanometers.

Since the nanoparticles of various metal and metal oxides, which can play a role as catalysts, electrode materials, sensor materials, and adsorbent materials, are selectively and uniformly dispersed into the shell of the metal oxide support, the hybrid structure of the present invention can also be used as a catalyst, an electrode material, a sensor material, an adsorbent materials, etc.

In particular, when the hybrid structure including metal oxide support and nanoparticles of metal or metal oxides monodispersed therein is used as a catalyst, it may have advantageous benefits in the diffusion of the reactants in a gaseous or a liquid catalytic reaction, and further, may obtain excellent reaction results even under a strict catalytic reaction environment while being stable at a high temperature. Specifically, in a reaction at a temperature of 200° C. or higher, such as the Fischer-Tropsch Synthesis, which can be problematic due to severe heating during reaction, a local hot spot may be occurred during the reaction, but the nanoparticle catalysts present within the pores of the shell may solve problems such as aggregation of neighboring nanoparticle catalysts.

The present invention may provide the hybrid structure as a catalyst in the form of an egg-shell comprising: a metal oxide support with an average diameter of nanometers or micrometers including a core of nonporous metal oxide and a shell of porous metal oxides; and particles of a nano catalyst having a limited position and size by pores of the shell of the metal oxide support; wherein the particles of the nano catalyst are highly dispersed into the pores of the surface of the metal oxide support. As defined above, the particles of the nano catalyst may be metal or metal oxides, and specifically, they may be nickel oxides, cobalt oxides, iron oxides, or complex metal oxides thereof.

For example, when containing nickel oxides as the particles of the nano catalyst, the hybrid structure may be used as an oxidation catalyst for carbon monoxide or hydrocarbons or a hydrogenation catalyst. When containing cobalt oxides as the particles of the nano catalyst, it may be used as a low temperature carbon monoxide oxidation catalyst. When containing iron oxides as the particles of the nano catalyst, it may be used as a catalyst for Fenton oxidation treatment.

The present invention may provide the hybrid structure as an electrode material in the form of an egg-shell comprising: a metal oxide support with an average diameter of nanometers or micrometers including a core of nonporous metal oxide and a shell of porous metal oxides; and particles of a nano electrode active material having a limited position and size by pores of the shell of the metal oxide support; wherein the particles of the nano electrode active material are highly dispersed into the pores of the surface of the metal oxide support. As defined above, the particles of the electrode active material may be metal or metal oxides, and specifically, they may be nickel oxides, cobalt oxides, iron oxides, or complex metal oxides thereof.

For example, when containing nickel oxides as the particles of the nano electrode active material, the hybrid structure may be used as an electrode material for a fuel cell. When containing cobalt oxides as the particles of the nano electrode active material, it may be used as an electrode material for a supercapacitor. When containing iron oxides as the particles of the nano electrode active material, it may be used as an electrode material for a solar cell.

The present invention may provide the hybrid structure as a sensor material in the form of an egg-shell comprising: a metal oxide support with an average diameter of nanometers or micrometers including a core of nonporous metal oxide and a shell of porous metal oxides; and particles of a nano sensor having a limited position and size by pores of the shell of the metal oxide support; wherein the particles of the nano sensor are highly dispersed into the pores of the surface of the metal oxide support. As defined above, the particles of the nano sensor may be metal or metal oxides, and specifically, they may be nickel oxides, cobalt oxides, iron oxides, or complex metal oxides thereof.

For example, when containing nickel oxides as the particles of the nano sensor, the hybrid structure may be used as a gas sensor. When containing cobalt oxides as the particles of the nano sensor, it may be used as an oxygen sensor, an optochemical sensor, etc. When containing iron oxides as the particles of the nano sensor, it may be used as a DNA sensor.

The present invention may provide the hybrid structure as an adsorbent material in the form of an egg-shell comprising: a metal oxide support with an average diameter of nanometers or micrometers including a core of nonporous metal oxide and a shell of porous metal oxides; and particles of a nano adsorbent having a limited position and size by pores of the shell of the metal oxide support; wherein the particles of the nano adsorbent are highly dispersed into the pores of the surface of the metal oxide support. As defined above, the particles of the nano adsorbent may be metal or metal oxides, and specifically, they may be nickel oxides, cobalt oxides, iron oxides, or complex metal oxides thereof.

For example, when containing iron oxides as the particles of the nano adsorbent, the hybrid structure may be used as an adsorbent material for treating contaminants, preferably organic contaminants, in the water treatment process.

Advantageous Effects

The present invention employs a metal oxide support with an average diameter of nanometers or micrometers including a core of nonporous metal oxide and a shell of porous metal oxides, thereby providing an excellent platform in a size of nanometers or micrometers which can selectively support nanoparticles in the porous shell portion. Further, by grinding and mixing precursors of nanoparticles, such as a hydrated metal salt and the metal oxide support with such structural feature above without solvents via melt infiltration, followed by calcinations according to the present invention, an egg-shell type hybrid structure of metal oxide support and more highly dispersed nanoparticles can be obtained, compared to using a solvent. The nanoparticles, which are active materials, are highly dispersed onto the surfaces of the hybrid structure, and thus high-yield reactions can be carried out thereon. Therefore, the hybrid structure can be used as catalysts, sensor materials, electrode materials, and adsorbent materials as it is advantageous in diffusion of reactants and dissipation of heat of reaction.

BRIEF DESCRIPTION OF DRAWINGS

FIG. 1 is a schematic diagram showing the preparation process of the egg-shell type hybrid structure of highly dispersed metals or metal oxides and silica according to one embodiment of the present invention.

FIG. 2 is a flow chart showing the preparation process of the egg-shell type hybrid structure of highly dispersed metals or metal oxides and silica according to one embodiment of the present invention.

FIG. 3 shows TEM images of silica particles prepared according to one embodiment of the present invention (a); and silica supports in which porous silica shells are coated onto the silica particles (b).

FIG. 4 shows TEM analysis results of the egg-shell hybrid structure of nickel oxide/silica prepared according to one embodiment of the present invention (a-b); and XRD analysis results thereof (c). Herein, (a) is a TEM image with a magnification of 50,000, and (b) is a TEM image with a magnification of 100,000.

FIG. 5 shows TEM analysis results of the egg-shell hybrid structures of cobalt oxide/silica obtained from each calcination temperature according to one embodiment of the present invention (a-b); and XRD analysis results thereof obtained by calcination at 400° C. (c). Herein, (a) was obtained under a calcination condition of 300° C. and (b) was obtained under a calcination condition of 400° C.

FIG. 6 shows TEM analysis results of the egg-shell hybrid structure of iron oxide/silica prepared according to one embodiment of the present invention (a); and XRD analysis results thereof (b).

FIG. 7 shows TEM analysis results of the egg-shell hybrid structure of cobalt oxide/silica prepared according to one embodiment of the present invention (a); and XRD analysis results thereof (b).

FIG. 8 shows TEM analysis results of the egg-shell hybrid structure of iron oxide/silica prepared according to one embodiment of the present invention (a); and HADDF-STEM analysis results thereof (b).

BEST MODE

Hereinafter, the present invention will be described in more detail with reference to the following examples. However, the following examples are provided for illustrative purposes only, and the scope of the present invention should not be limited thereto in any manner.

Example 1

Large-Scale Synthesis of Silica Particles and Coating of Porous Silica Shells

Nonporous silica nanoparticles which may be used as a silica support were prepared by a well-known process, the Stober process.

First, in order to obtain spherical silica particles, 40 mL of ammonium hydroxide solution (28%) and 100 mL of tetraethyl orthosilicate (TEOS) were further added to a 2 L Erlenmeyer flask containing 1 L of ethanol and 160 mL of distilled water, and the resulting mixture was stirred for 2 hours.

The silica particles obtained after 2 hours of stirring were precipitated by centrifugation and dispersed in ethanol so as to be used in the experiment. The particles were washed twice or more by a repeated dispersion-precipitation process using ethanol to minimize small traces of ammonia that may have remained after washing.

Subsequently, using the solution in which the silica particles obtained by the Stober process were dispersed in ethanol, the shells of porous silica were further formed on the surface of the silica particles.

First, 1.2 g of cetrimonium bromide reagent (($C_{16}H_{33}$)N($CH_3$)$_3$Br, cetyltrimethylammonium bromide, hexadecyltrimethylammonium bromide, CTAB) was fully dissolved in a mixed solution of 20 mL of distilled water and 10 mL of ethanol. 200 mL of distilled water and 60 mL of colloid solution in which 0.181 M of silica particles were suspended, obtained from above, were added thereto, and the resulting mixture was stirred for 30 minutes. Thereafter, 2.15 mL of a tetraethyl orthosilicate reagent was added thereto, and the resulting mixture was stirred again for 12 hours.

After 12 hours of reaction, the resulting mixture was precipitated by centrifugation and washed repeatedly by adding water, ethanol, and acetone in sequence via a dispersion-precipitation process. The finally-obtained powder was sufficiently dried in an oven set at 100° C. and then subjected to heat treatment under the atmosphere at 500° C. for 8 hours using a calcination apparatus to obtain a silica support in which porous silica shells were coated onto the nonporous silica particles.

Transmission electron microscopy (TEM) images of the silica particles obtained above (a) and the silica support in which porous silica shells were coated onto silica particles (b) are illustrated in FIG. 3. As can be observed from TEM images of FIG. 3, the spherical silica nanoparticles obtained by the method above were uniformly formed with a size of 280 nm. It can be seen from the TEM image of FIG. 3b) that the shells of porous silica were formed with a size of 50 nm through silica coating using CTAB and a heating process.

Example 2

Synthesis of Egg-Shell Hybrid Structure of Nickel Oxide/Silica 0.5 g of silica nanoparticles having porous silica shells obtained in Example 1 and 0.275 g of Ni(NO$_3$)$_2$.6H$_2$O salt were uniformly pulverized using a mortar. After sufficient pulverization, the mixed powder was placed in a 30 mL container made of polypropylene, the cap of the container was tightly sealed, and the powder was subjected to curing in a drying oven set to 60° C. for 24 hours. After 24 hours of curing, the powder was cooled at room temperature, which was then calcinated under the atmosphere at 400° C. for 4 hours using a calcination apparatus to obtain an egg-shell type nickel oxide/silica hybrid structure containing 10 wt % nickel.

TEM analysis results of the egg-shell type hybrid structure of nickel oxide/silica (a-b) and X-ray diffraction (XRD) analysis results for qualitative analysis thereof (c) are illustrated in FIG. 4. In FIG. 4, (a) is a TEM image with a magnification of 50,000, and (b) is a TEM image with a magnification of 100,000.

As confirmed in FIGS. 4a to 4b, the particles were formed with a size of 10 nm to 40 nm. Also, the XRD analysis showed peaks corresponding to NiO crystals in FIG. 4c.

Example 3

Synthesis of Egg-Shell Hybrid Structures of Cobalt Oxide/Silica 0.5 g of silica nanoparticles having porous silica shells obtained in Example 1 and 0.274 g of Co(NO$_3$)$_2$.6H$_2$O salt were uniformly pulverized using a mortar. After sufficient pulverization, the mixed powder was placed in a 30 mL container made of polypropylene, the cap of the container was tightly sealed, and the powder was subjected to curing in a drying oven set to 60° C. for 24 hours. After 24 hours of curing, the powder was cooled at room temperature, which was then calcinated under the atmosphere at 300° C. or 400° C. for 4 hours independently using a calcination oven to obtain egg-shell type cobalt oxide/silica hybrid structures containing 10 wt % cobalt.

TEM analysis results of the egg-shell hybrid structures of cobalt oxide/silica obtained from each calcination temperature are illustrated in FIGS. 5a and 5b, and XRD analysis results for qualitative analysis of the egg-shell hybrid structure of cobalt oxide/silica obtained by calcination at 400° C. are illustrated in FIG. 5c. Herein, FIG. 5a is a TEM image of the egg-shell hybrid structure of cobalt oxide/silica obtained by calcination at 300° C. and FIG. 5b is a TEM image of the egg-shell hybrid structure of cobalt oxide/silica obtained by calcination at 400° C.

As can be confirmed in FIGS. 5a and 5b, numerous cobalt oxide particles are found inside of the silica shells, and changes observed according to the difference in calcination temperatures of 300° C. and 400° C. were not significant. Also, the structure of the particles was found to be $Co_3O_4$ crystals via XRD analysis in FIG. 5c.

Example 4

Synthesis of Egg-Shell Hybrid Structure of Iron Oxide/Silica 0.5 g of silica nanoparticles having porous silica shells obtained in Example 1 and 0.402 g of $Fe(NO_3)_3.9H_2O$ salt were uniformly pulverized using a mortar. After sufficient pulverization, the mixed powder was placed in a 30 mL container made of polypropylene, the cap of the container was tightly sealed, and the powder was subjected to curing in a drying oven set to 50° C. for 24 hours. After 24 hours of curing, the powder was cooled at room temperature, which was then calcinated under the atmosphere at 500° C. for 4 hours using a calcination oven to obtain an egg-shell type iron oxide/silica hybrid structure containing 10 wt % iron.

TEM analysis result of the egg-shell type iron oxide/silica hybrid structure obtained above (a) and XRD analysis results for qualitative analysis thereof (b) are illustrated in FIG. 6.

As can be confirmed in FIG. 6a, numerous iron oxide particles are found inside and on surfaces of the silica shells. Also, the structure of the particles was found to be $Fe_2O_3$ crystals via XRD analysis in FIG. 6b.

Example 5

Synthesis of Egg-Shell Hybrid Structure of Cobalt Oxide/Silica 0.5 g of silica nanoparticles having porous silica shells obtained in Example 1 and 0.274 g of $Co(NO_3)_2.6H_2O$ salt were uniformly pulverized using a mortar. After sufficient pulverization, the mixed powder was placed in a 30 mL container made of polypropylene, the cap of the container was tightly sealed, and the powder was subjected to curing in a drying oven set to 60° C. for 24 hours. After 24 hours of curing, the powder was cooled at room temperature, which was then calcinated under nitrogen atmosphere with a velocity of 200 mL/min at 400° C. for 4 hours using a tube-type calcination oven to obtain an egg-shell type cobalt oxide/silica hybrid structure containing 10 wt % cobalt.

TEM analysis results of the egg-shell type cobalt oxide/silica hybrid structure obtained above (a) and XRD analysis results for qualitative analysis thereof (b) are illustrated in FIG. 7.

As can be confirmed in FIG. 7a, numerous cobalt oxide particles are found inside and on surfaces of the silica shells. Also, the structure of the particles was found to be $Fe_2O_3$ crystals via XRD analysis in FIG. 6b. Also, the crystal size of the cobalt oxide particles in the hybrid structure obtained by calcination at 400° C. under nitrogen atmosphere in FIG. 7b appears slightly smaller than the crystal size of cobalt oxide particles obtained by calcination under the atmosphere (Example 3, FIG. 5c), which is confirmed by the broadness of the peaks.

Example 6

Synthesis of Egg-Shell Hybrid Structure of Iron Oxide/Silica 0.5 g of silica nanoparticles having porous silica shells obtained in Example 1 and 0.402 g of $Fe(NO_3)_3.9H_2O$ salt were uniformly pulverized using a mortar. After sufficient pulverization, the mixed powder was placed in a 30 mL container made of polypropylene, the cap of the container was tightly sealed, and the powder was subjected to curing in a drying oven set to 50° C. for 24 hours. After 24 hours of curing, the powder was cooled at room temperature, which was then calcinated under nitrogen atmosphere with a velocity of 200 mL/min at 400° C. for 4 hours using a tube-type calcination oven to obtain an egg-shell type iron oxide/silica hybrid structure containing 10 wt % iron.

TEM analysis results of the egg-shell type iron oxide/silica hybrid structure obtained above (a) and high angle annular dark field-scanning transmission electron microscopy (HADDF-STEM) analysis results thereof (b) are illustrated in FIG. 8.

As can be confirmed in FIGS. 8a and 8b, small particles of iron oxide are found inside and on surfaces of the silica shells.

The invention claimed is:
1. A method for preparing an egg-shell type hybrid structure, the egg-shell type hybrid structure comprising:
   a metal oxide support with an average diameter of nanometers or micrometers comprising a core of nonporous metal oxide and a shell of porous metal oxides; and
   nanoparticles, positioned inside the pores of the metal oxide support, thereby limiting a size of the nanoparticles to a size of the pores of the shell of the metal oxide support;
   the method comprising:
   preparing particles of nonporous metal oxides (Step 1);
   coating pore-forming materials and precursors of metal oxides onto the surface of particles of the nonporous metal oxides, followed by thermal treatment to form a shell of porous metal oxides, thereby obtaining powder of a metal oxide support having a core-shell structure (Step 2);
   grinding and mixing the powder of the metal oxide support of the core-shell structure and a metal-containing compound having a melting point lower than that of the metal oxide support, and subsequently melt-infiltrating the metal-containing compound into the pores of the surface of the metal oxide support at a temperature between the melting point of the metal-containing compound and 5° C. higher in a closed system (Step 3); and
   calcining composite powder formed from melt infiltration (Step 4).
2. The method of claim 1, wherein the egg-shell type hybrid structure is a catalyst in the form of an egg-shell and the nanoparticles are particles of a nano catalyst.
3. The method of claim 2, wherein the catalyst is applied in a gaseous or liquid catalyst reaction.

4. The method of claim 2, wherein metal oxides of the metal oxide support are silica, alumina, titanic, zirconia, or a combination thereof.

5. The method of claim 2, wherein the particles of the nano catalyst are metal or metal oxides.

6. The method of claim 1, wherein the egg-shell type hybrid structure is an electrode material in the form of an egg-shell; and the nanoparticles are particles of a nano electrode active material.

7. The method of claim 1, wherein the egg-shell type hybrid structure is a sensor material in the form of an egg-shell; and the nanoparticles are particles of a nano sensor.

8. The method of claim 1, wherein the egg-shell type hybrid structure is an adsorbent material in the form of an egg-shell; and the nanoparticles are particles of a nano adsorbent.

9. The method of claim 1, wherein the metal oxide support forms the shell of porous metal oxides by coating pore-forming materials and precursors of metal oxides onto the surface of particles of nonporous metal oxides, followed by removal of the pore-forming materials via thermal treatment.

10. The method of claim 9, wherein the pore-forming materials comprise a long carbon chain of C10 to C30.

11. The method of claim 1, wherein metal oxides of the metal oxide support are silica, alumina, Mania, zirconia, or a combination thereof.

12. The method of claim 1, wherein the nanoparticles are metals or metal oxides.

13. The method of claim 1, wherein the metal-containing compound having a melting point lower than that of the metal oxide support is a metal hydrate salt.

14. The method of claim 1, wherein the dispersibility and/or oxidation state of the nanoparticles of metal or metal oxides are regulated by regulating the calcination atmosphere.

15. The method of claim 1, wherein the calcination is carried out in the atmosphere or under nitrogen atmosphere.

16. The method of claim 1, wherein the calcination is carried out at a temperature range of 200° C. to 700° C.

17. The method of claim 1, wherein an average diameter of the nanoparticles is 2 nm to 20 nm.

18. The method of claim 1, wherein an average diameter of the hybrid structure may be 100 nm to 1000 nm.

19. The method of claim 1, wherein the nanoparticles of metal or metal oxides are located into the pore of the shell of the metal oxide support by grinding powder of metal oxide support and a metal-containing compound having a melting point lower than that of the metal oxide support and mixing the same, and subsequently subjecting the metal-containing compound to melt infiltration into the pores of the surface of the metal oxide support at a temperature between the melting point of the metal-containing compound and 5° C. higher in a closed system, followed by calcining composite powder formed therefrom.

* * * * *